United States Patent [19]

Ahn

[11] Patent Number: 5,403,985
[45] Date of Patent: Apr. 4, 1995

[54] MACHINE FOR MANUFACTURING CONSTRUCTION PANELS

[75] Inventor: Se-Hong Ahn, Seoul, Rep. of Korea

[73] Assignees: Sung-Ho Ahn; Sung-Il Ahn, both of Seoul, Rep. of Korea

[21] Appl. No.: 7,846

[22] Filed: Jan. 22, 1993

[30] Foreign Application Priority Data

Jul. 22, 1992 [KR] Rep. of Korea .................... 92-13061

[51] Int. Cl.$^6$ ...................... B23K 11/11; B21F 27/20
[52] U.S. Cl. ...................... 219/56; 140/112
[58] Field of Search .............. 140/112; 228/4.1, 173.5, 228/189; 219/56, 57, 58; 52/309.4, 309.7, 749

[56] References Cited

U.S. PATENT DOCUMENTS

| | | | |
|---|---|---|---|
| 3,305,991 | 2/1967 | Weismann | 140/112 |
| 3,555,131 | 1/1971 | Weismann | 140/112 |
| 4,226,067 | 10/1980 | Artzer | 52/309.12 |
| 4,340,802 | 7/1982 | Artzer | 219/56 |
| 4,500,763 | 2/1985 | Schmidt et al. | 219/58 |
| 4,614,013 | 9/1986 | Stevenson | 140/112 |
| 4,917,284 | 4/1990 | Candivacci | 219/56 |
| 5,102,027 | 4/1992 | Se-Hong | 228/4.1 |

FOREIGN PATENT DOCUMENTS

| | | | |
|---|---|---|---|
| 94809 | 11/1983 | European Pat. Off. | 140/112 |
| 389465 | 9/1990 | European Pat. Off. | 140/112 |
| 21625 | 5/1986 | Rep. of Korea . | |

Primary Examiner—Geoffrey S. Evans
Attorney, Agent, or Firm—Michael J. Striker

[57] ABSTRACT

The machine for manufacturing a construction panel has a plurality of clamping mechanisms (32) for holding fixed a subassembly including a plate-shaped heat insulating core (12) and upper and lower wire meshes (18,24) with predetermined gaps between them; a reciprocating carriage (44) mounted slidably in a longitudinal direction on a main frame (30); carriage driving mechanism (46) for moving the carriage (44) on the main frame (30) including a driving motor (140), an electromagnetic clutch (142) and a ball screw (144); a subassembly guide (34) for maintaining the predetermined gaps; first and second supporting member feeding and inserting mechanisms (36,38), each of which include feeding units (82) having hoppers (86) for discharging one-by-one a plurality of pre-cut first and second supporting members (26,28) and a plurality of inserting units (84), each of the inserting units including a pneumatic cylinder (92) having a piston rod (94) and a plunger (96) connected to the piston rod (94); and upper and lower electric welding mechanisms (4) for spot welding the longitudinal wires of the upper and lower wire meshes (18,24) with the first and second supporting members (26,28) to form a finished construction panel (10).

8 Claims, 9 Drawing Sheets

MACHINE FOR MANUFACTURING CONSTRUCTION PANELS

BACKGROUND OF THE INVENTION

The present invention relates to a machine for manufacturing a panel for use in construction and, more particularly, to a machine for manufacturing a panel including two wire meshes made of wire consisting of a thin rod, a flat heat insulating core disposed between the wire meshes, first supporting members passing through the wire meshes and the core inclined in one direction, and second supporting members passing through the wire meshes and the core inclined in a direction opposite to the first supporting members, the supporting members being welded to the wire meshes to form a three-dimensional panel for use in construction.

Generally, the light plastics including formed synthetic resins and expanded plastics, such as urethane and polystyrene, have the proper characteristics required in walls and ceilings, i.e., light weight, low heat conductivity, anti-abrasive, low water permeability, acoustic shielding property and the like. However, they are weak with regard to their structural strength. Therefore, they are coupled with a structurally strong reinforcing frame, when used as a construction material.

Examples of this type of panel are disclosed in U.S. Pat. Nos. 3,305,991; 3,555,131 and 4,226,067.

U.S. Pat. No. 3,305,991 describes a manufacturing process in which a complete frame is separately manufactured and inserted into a fabricating vessel and a fluid is also poured into the fabricating vessel so that the frame is immersed in the fluid to form a certain gap between the bottom of the frame and the bottom of a foamed panel to be formed. A film forming fluid is poured into the fabricating vessel to form a film on the inner surface of the fabricating vessel and a liquid foam material is poured into the fabricating vessel. Then curing is carried out so as to form a reinforced panel for use in construction.

U.S. Pat. No. 3,555,131 discloses a device and a method for assembling this type of panel. U.S. Pat. No. 4,226,067 deals with an assembled panel manufactured by a process in which a foamed plastic is fitted between two truss-shaped side frames and a plurality of them are laterally combined in close contact with each other. Then, the upper and lower portions of the side frames are spot welded to unite the side frames, to provide an assembled reinforced panel with reinforcing core.

The method disclosed in U.S. Pat. No. 3,305,991 requires an enormous amount of investment in the manufacturing facility, since it uses the manufacturing device of U.S. Pat. No. 3,555,131, which is an expensive special device for manufacturing an integrated frame. Furthermore, the foamings must be carried out one-by-one in the fabricating vessel and therefore it is impossible to produce the foamed panel in a mechanized manner. Also, it is not only difficult to maintain a constant gap between the surface of the foamed resin and the surface of the integrated frame, but also irregularity occurs on the surface of the foamed resin, and the position of the foamed resin is not made in an accurate way. Furthermore, the foamed body is actually contacted with the external frame at many places and therefore, when finishing, is carried out with a cement mortar; the placing of the united frame cannot be perfect.

In accordance with the method of U.S. Pat. No. 4,226,067, small gaps between the heat insulating cores which are filling members arranged in a lateral direction can occur. Therefore, the heat insulating and acoustic shielding characteristics are reduced and the manufacturing process is complicated.

Korean Patent 21,625 describes improvements in the device described hereinabove. U.S. Pat. No. 5,102,027 describes an additional improvement in the manufacturing machine for making a heat insulating panel described in Korean Patent 21,625. Korean Patent 21,625 discloses a manufacturing machine in which the upper and lower wire meshes are disposed above and below the heat insulating core with certain gaps therebetween and are fitted into a jig. The jig is intermittently moved a certain distance, and at the same time wires which are to serve as supporting members for the wire meshes and the heat insulating core are continuously inclinedly inserted and cut off. Then, the contacts between the cut supporting members and the upper and lower wire meshes are spot welded so as to a form three-dimensional construction panel.

Usually, the construction panels have a width of 1.22 m (4 feet) and a length of 2.44 to 4.26 m (8–14 feet). Due to this large size, it is advantageous to produce the panels near the consuming location rather than to transport them a long distance.

Korean Patent 21,625 describes a machine having the advantage that a panel having a heat insulating core of superior heat insulating characteristics and acoustic shielding characteristics can be mass produced with it. However disadvantageously the means for supplying the inclined wires is very complicated and consumes a large amount of energy. The size of this means is too large and it has too many parts, so that it is difficult to carry them to the consuming place. Also, this results in repair and maintenance difficulties. The process for assembling the upper and lower wire meshes and the heat insulating cores to maintain certain gaps between them is very troublesome and causes a decrease in productivity.

U.S. Pat. No. 5,102,027, which was issued to an inventor of the subject matter disclosed herein, describes a machine for manufacturing an insulating panel which is an improvement of the machine described in the aforementioned Korean Patent 21,625.

In the manufacturing machine described in the aforementioned U.S. Pat. No. 5,102,027 the panel subassembly in which the lower wire mesh, the insulating core and the upper wire mesh are stacked with predetermined gaps between them on spacer angles attached at predetermined intervals to the conveyor intermittently driven by a stepping motor, the supporting members which have been cut in advance to a predetermined length are moved toward the fixed feeding and inserting mechanism and then the supporting members are applied to the aforesaid panel subassembly by the feeding and inserting mechanism, and the longitudinal wires of the upper and lower wire meshes and the contacting portions of the inserted supporting members are spot welded by the electric welding mechanisms spaced from the feeding and inserting mechanisms so as to manufacture a three-dimensional panel for use in construction.

Since the manufacturing machine described in U.S. Pat. No. 5,102,027, moves the panel subassembly toward the fixed supporting member feeding and inserting mechanism and the electric welding mechanism, it should have a length of four times more than a length of the construction panel to be manufactured. Thus it has not been possible to decrease the entire magnitude and weight of the manufacturing machine.

SUMMARY OF THE INVENTION

It is an object of the present invention to provide a manufacturing machine for a construction panel, which is improved in relation to the manufacturing machine described in U.S. Pat. No. 5,102,027.

According to the invention, the machine for manufacturing a construction panel in which a plate-shaped heat insulating core and upper and lower wire meshes are maintained with predetermined gaps between them by a clamping mechanism provided at an end of the main frame and by clamping one end portion of the insulating core and the upper and lower wire meshes. A reciprocating carriage which supports supporting member feeding and inserting mechanisms, the electric welding mechanisms and the guide means for maintaining the predetermined gaps between the heat insulating core and the upper and lower wire meshes, is moved by carriage drive means intermittently over a predetermined interval on the main frame and simultaneously, the supporting members are inserted through tile upper wire mesh, the heat insulating core and the lower wire mesh and then welded thereto.

Novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

For a better understanding of the invention, and to show how the same may be carried into effect, reference will now be made, by way of example, with respect to the accompanying drawings, in which:

FIG. 8 is a perspective view of a part of clamping mechanisms for fixing a upper wire mesh, an insulating core and a lower wire mesh to be maintained with predetermined gaps among them in the manufacturing machine shown in FIG. 2.

DETAILED DESCRIPTION OF THE PREFERRED EMBODIMENT

Figure 1:
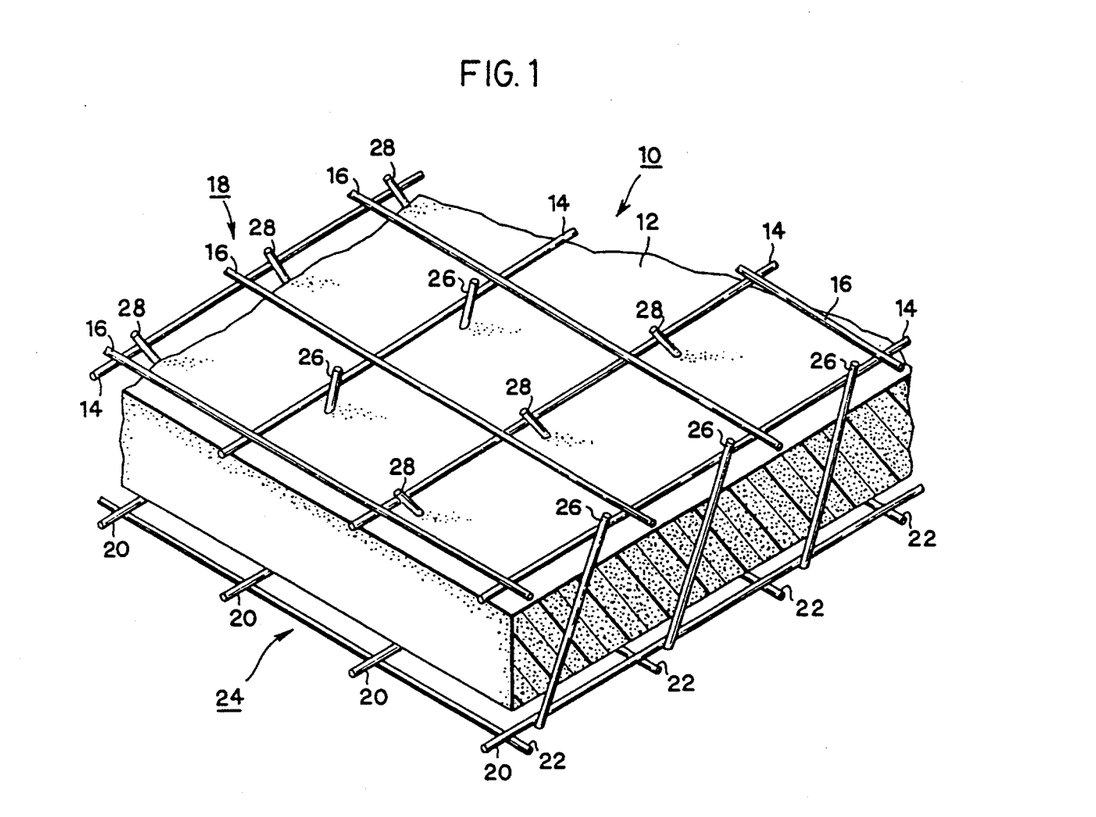
FIG. 1 is a fragmentary perspective view of a panel manufactured by a machine in accordance with the present invention.

FIG. 1 shows a panel 10 having a three-dimensional structure manufactured by a manufacturing machine of the present invention. The panel 10 includes an upper wire mesh 18 having longitudinal wires 14 and lateral wires 16 arranged at predetermined intervals, a lower wire mesh 24 having longitudinal wires 20 and lateral wires 22 arranged at predetermined intervals and a plate-shaped heat insulating core 12 made of a synthetic resin foam, such as polystyrene, between them.

Supporting members 26,28 are inserted in different directions through the upper wire mesh 18, the heat insulating core 12 and the lower wire mesh 24. The supporting members include first supporting members 26 and second supporting members 28. The first supporting members 26 are inclined or slanted oppositely to the second supporting members 28. Both tip end portions of the first and second supporting members 26,28 are spot welded to the longitudinal wires 14,20 of the upper and lower wire meshes 18,24.

Figure 2:
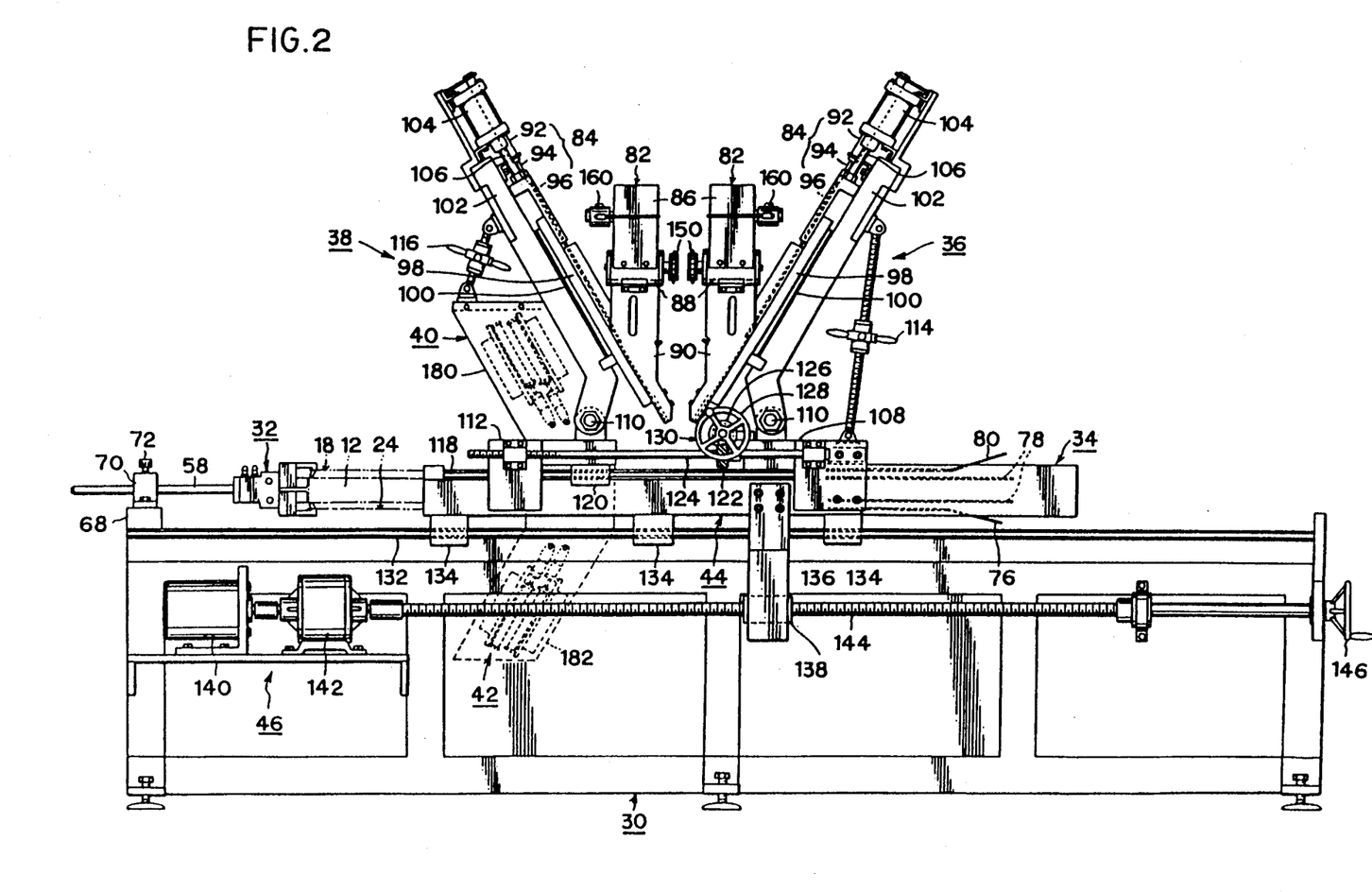
FIG. 2 is a schematic view of the manufacturing machine in accordance with the present invention.

As shown in FIG. 2, the manufacturing machine of the present invention comprises a plurality of clamping mechanisms or means 32 for holding fixed end portions of the plate-shaped heat insulating core 12 and the upper and lower wire meshes 18,24 shown in FIG. 1 on the front side of main frame 30 with predetermined gaps between them; a plurality of guide means or guides 34 for guiding the plate-shaped heat insulating core 12 and the upper and lower wire meshes 18,24 toward these clamping mechanisms 32 and for maintaining other portions of the plate-shaped heat insulating core 12 and the upper and lower wire meshes 18,24 clamped with one end portion by the clamping mechanisms 32 with predetermined gaps between them; a reciprocating carriage 44 which is provided with a feeding and inserting mechanism 36 of the first supporting member 26 shown in FIG. 1, a feeding and inserting mechanism 38 of the second supporting member 28, and a upper electric welding mechanism 40 and a lower electric welding mechanism 42 for spot welding the contacting portions of the first and second supporting members 26,28 which pass through the upper wire mesh 18, the heat insulating core 12 and the lower wire mesh 24 by these feeding and inserting mechanisms 36,38, with the upper and lower wire meshes 18,24; and a driving mechanism 46 for moving this reciprocating carriage 44 on a main frame 30.

FIG. 3 and FIGS. 4A, 4B, 4C concretely show the clamping mechanisms 32.

Figure 4A:
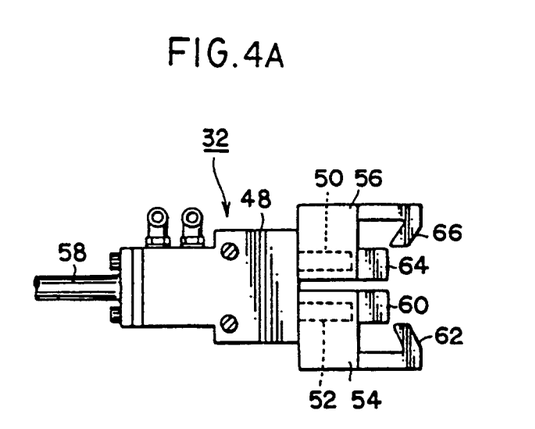
FIG. 4A is a side view showing a closed state of the clamping mechanism shown in FIG. 3.
Figure 4B:
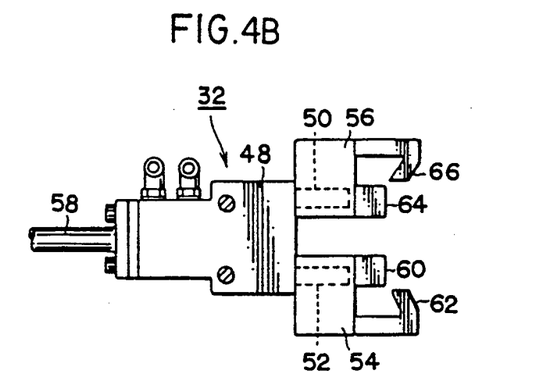
FIG. 4B is a side view showing an opened state of the clamping mechanism shown in FIG. 3.
Figure 4C:
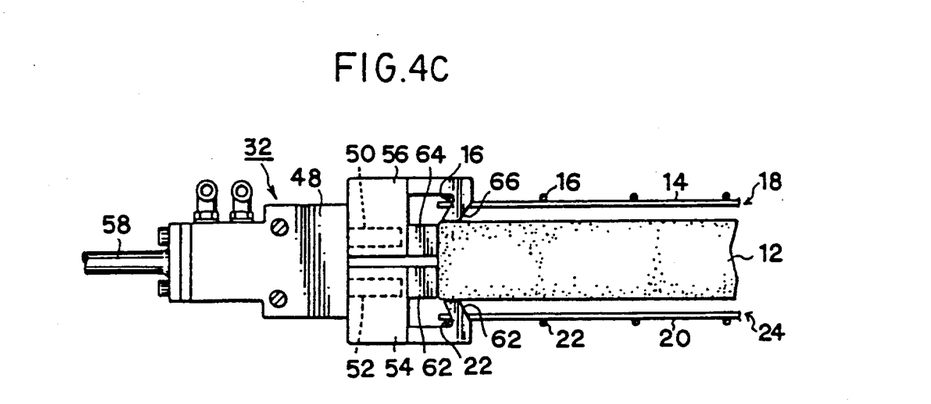
FIG. 4C is a side view showing a state that a upper wire mesh, a heat insulating core and a lower wire mesh are fixed by maintaining predetermined gaps among them by the clamping mechanism shown in FIG. 3.

A clamping mechanism 32 is fixed with attachments 54,56, to jaws 50,52 of an ordinary air chuck 48 as shown in FIGS. 4A and 4B, and a fixing bar 58 provided at a side of the air chuck 48.

A lower attachment 54 includes a protuberance 60 for contacting with one side end of the plate-shaped heat insulating core 12, and a hook 62 for hooking the lower wire mesh 24 and for holding the bottom surface of the heat insulating core 12, while a upper attachment 56 includes a protruberance 64 for contacting one side end of the plate-shaped heat insulating core 12, and a hook 66 for hooking the upper wire mesh 18 and for pressing the top surface of the heat insulating core 12.

Figure 3:
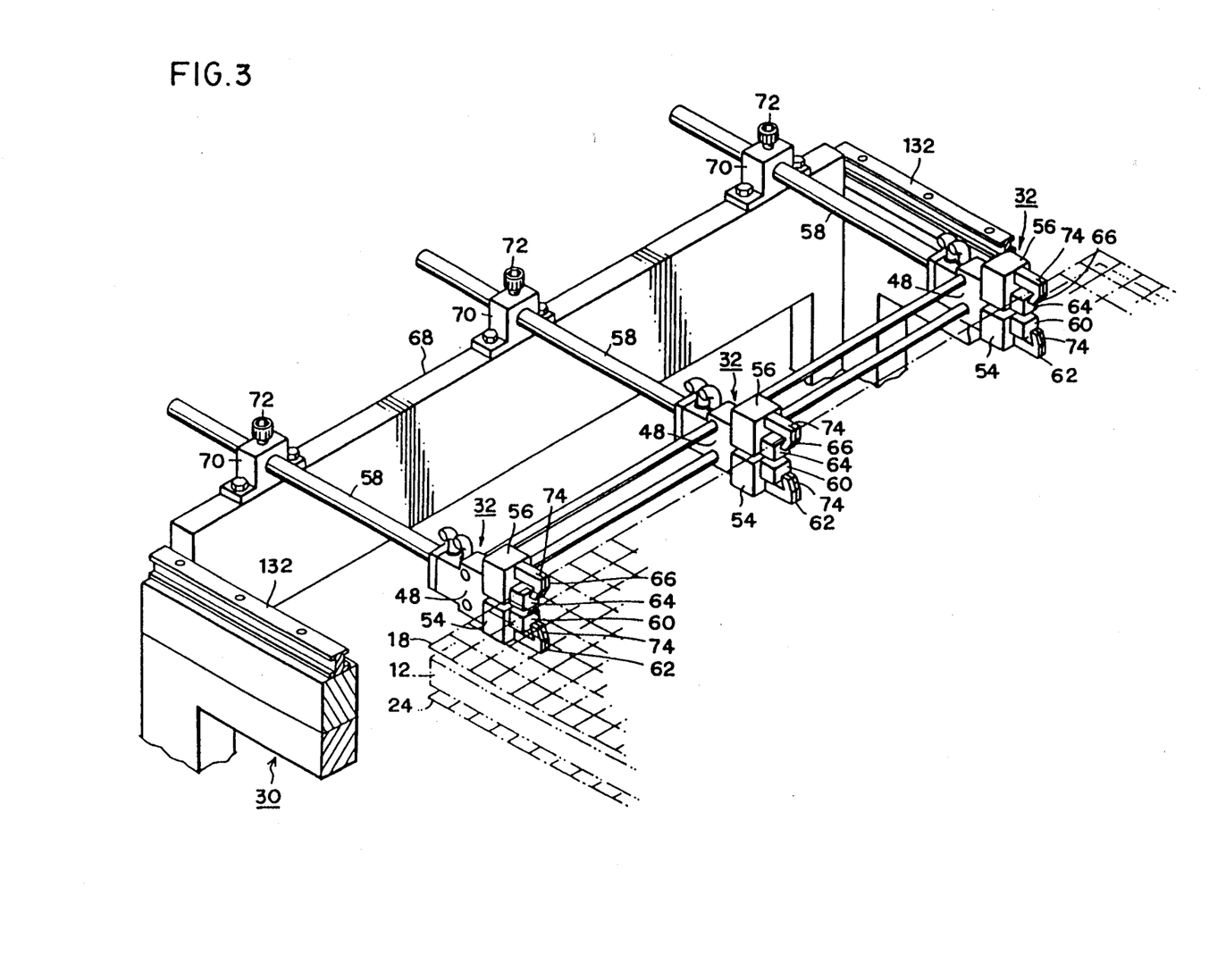

A fixing bar 58 attached to the other side of the air chuck 48 is inserted into a fixing block 70 held on a front side frame 68 of main frame 30 as shown in Figs. 2 and 3. It is held fixed by an adjusting bolt 72 by means of which distance between the air chuck 48 and the front side frame 68 is adjusted.

A slit 74 capable of receiving the upper and lower wire meshes 18,24 is provided in the hooks 62,66 of the lower attachment 54 and the upper attachment 56 as shown in FIG. 3, so that the upper and lower wire meshes 18,24 can be held fixed.

A guide 34 is fixed at a rear side of the reciprocating carriage 44 as shown in FIG. 2.

A lower guide plate 76 for holding the lower wire mesh 24, an intermediate guide plate 78 for holding the plate-shaped heat insulating core 12, and an upper guide plate 80 for holding the upper wire mesh 18 are provided in the guide 34.

The feeding and inserting mechanism 36 of the first supporting member 26 and the feeding and inserting mechanism 38 of the second supporting member 28 are installed facing one another so that the supporting members are fed at opposite equal slant angles from the feeding and inserting mechanisms 36,38.

Figure 5:
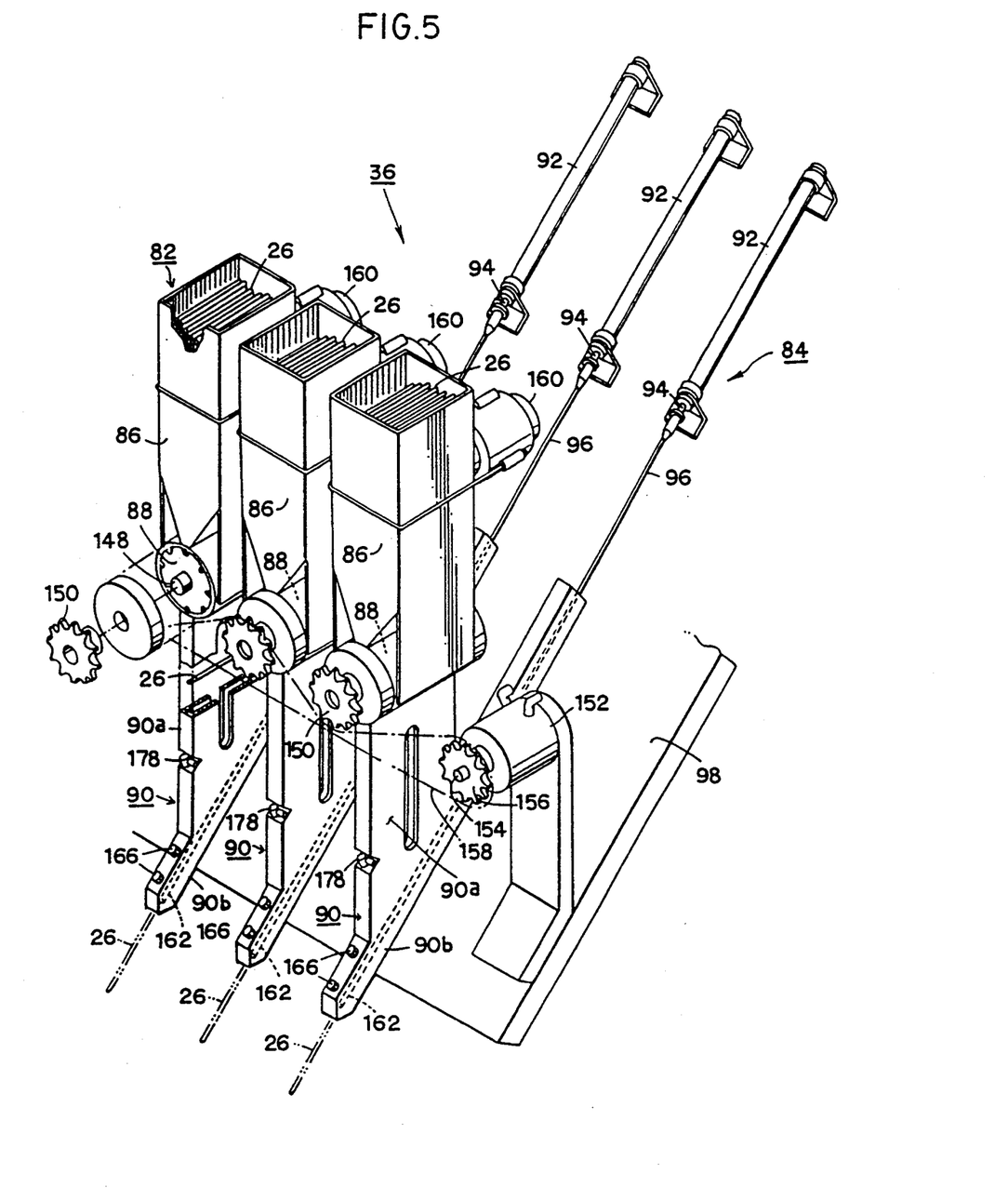
FIG. 5 is a partly extracted perspective view of a feeding and inserting mechanism of the supporting members passing through the upper wire mesh, the heat insulating core and the lower wire mesh of the manufacturing machine of the present invention.

The feeding and inserting mechanisms 36,38 of the first and second supporting members 26,28 include substantial structure and include a multiplicity of feeding units 82 and inserting units as shown in FIG. 5.

A feeding unit 82 includes a hopper 86 containing the supporting members 26,28 which have been pre-cut to a predetermined length, a discharging drum 88 for dropping the supporting members contained within this hopper 86 one-by-one and a chute 90.

An inserting unit 84 includes a pneumatic cylinder 92 and a plunger 96, which is connected with a piston rod 94 of this pneumatic cylinder 92 and moves into the chute 90.

The feeding unit 82 and the inserting unit 84 are fixed on an operating plate 98, and the operating plate 98 is slidably supported on a fixed plate 100, and the fixed plate 100 is fixed to an arm 102.

The operating plate 98 is connected with a piston rod 106 of an oil pressure cylinder 104 fixed to the fixed plate 100 so as to be movable up and down on the fixed plate 100.

A bottom end portion of the arm 102 of the feeding and inserting mechanism 36 of the first supporting member 26 is pivotally mounted via a pin 110 on a fixed saddle 108, while a bottom end portion of the arm 102 of the feeding and inserting mechanism 38 of the second supporting member 28 is pivotally mounted via a pin 110 on a moving saddle 112. These arms 102 are orientable at different slant angles by ordinary slant angle adjusting mechanisms 114,116, respectively.

The fixed saddle 108 is fixed on the reciprocating carriage 44, while the moving saddle 112 has a slider 120 mounted slidably on a guide rail 118 fixed to the reciprocating carriage 44 so that the moving saddle 112 is slidable over the reciprocating carriage 44.

The distance between the fixed saddle 108 and moving saddle 112 is adjustable via a screw shaft 124 fixed with a worm 122 as well as a moving mechanism 130 including a worm gear 126 and a manual handle 128.

The reciprocating carriage 44 has a guide rail 132 fixed to the main frame 30 so as to be able to move in a longitudinal direction on the main frame 30.

A bridge piece 136 is extended below the reciprocating carriage 44 and a ball nut 138 is fixed at the lower end of this bridge piece 136.

A driving mechanism 46 comprises a driving motor 140, an electromagnetic clutch 142, and a ball screw 144 coupled with the ball nut 138 of the reciprocating carriage 44.

A manual handle 146 is fixed at an end of the ball screw 144 to be able to finely adjust the position of the reciprocating carriage 44.

Driven sprocket wheels 150 are fixed respectively to the rotary shafts 148 of the discharging drums 88 of the feeding unit 82 and the driven sprocket wheels 150 and a driving sprocket wheel 158 fixed to a rotary shaft 154 of an oil pressure rotor 152 fixed on the operating plate 98 shown in FIG. 5 are connected via a link chain 158. Conventional vibrating mechanisms 160 for a smooth discharge of the first and second supporting members 26,28 contained in the hoppers 86 of the feeding unit 82 are fixed to the hoppers 86.

Figure 6:
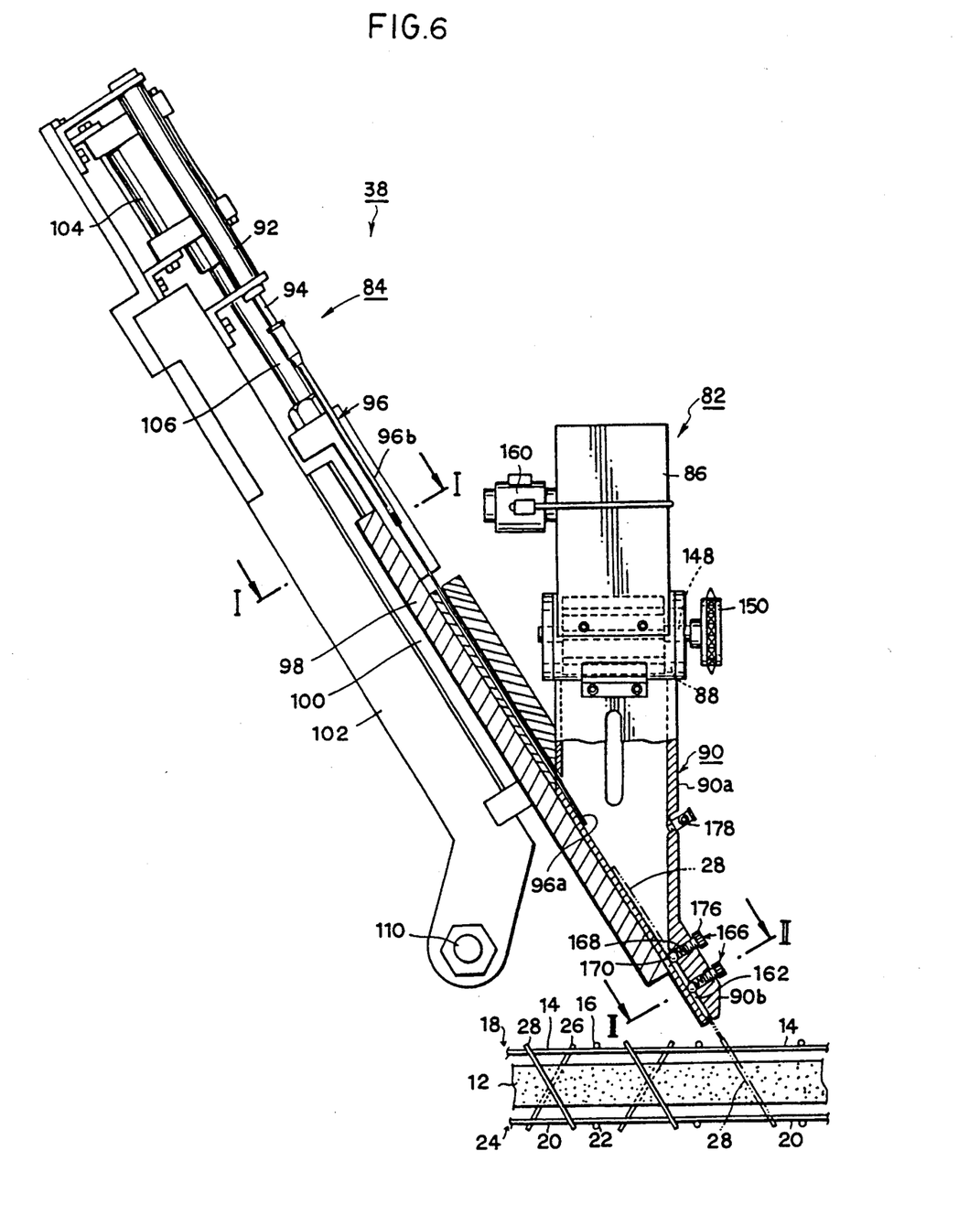
FIG. 6 is a partly cut out side view showing a state for inserting the supporting member by the feeding and inserting mechanism of the supporting members shown in FIG. 2 and FIG. 5 through the upper wire mesh, the insulating core and the lower wire mesh shown in FIG. 4C.

FIG. 6 concretely shows the feeding and inserting mechanism 38 of the second supporting member 28.

Figure 7:
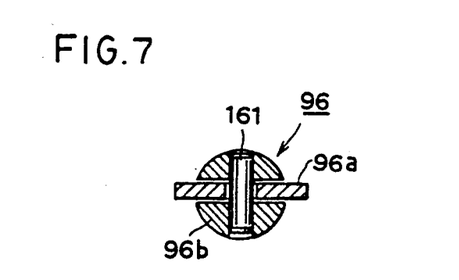
FIG. 7 is a detailed cross-sectional view taken along section line I—I of FIG. 6 showing a plunger for pushing the supporting member shown in FIG. 1 in a connected state.

A plunger 96 of the inserting unit 84 comprises a lower plunger 96a, which pushes the second supporting member 28 and is thin and long and is thinner than the second supporting member 28, and an upper plunger 96b connnected with a piston rod 94 of a pneumatic cylinder 92 and via pin 161 with the lower plunger is shown in FIGS. 6 and 7.

A discharge chute 90 of the feeding unit 82 includes a vertical chute 90a positioned under the discharging drum 88 and a slant chute 90b fixed to the operating plate 98.

Figure 8A:
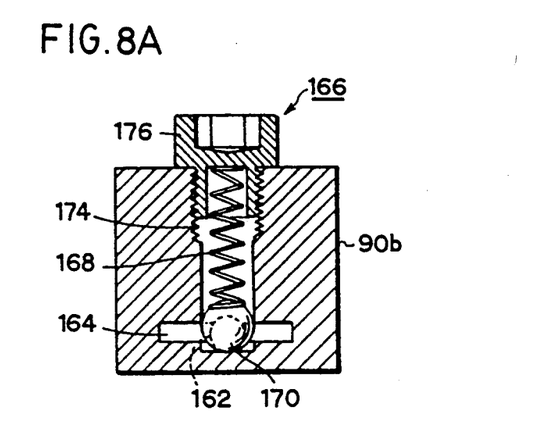
FIG. 8A is a detailed cross-sectional view taken along section line II—II of FIG. 6 showing a configuration in which a supporting member passage is closed by a blocking mechanism for preventing dropping of the supporting member under the action of gravity.
Figure 8B:
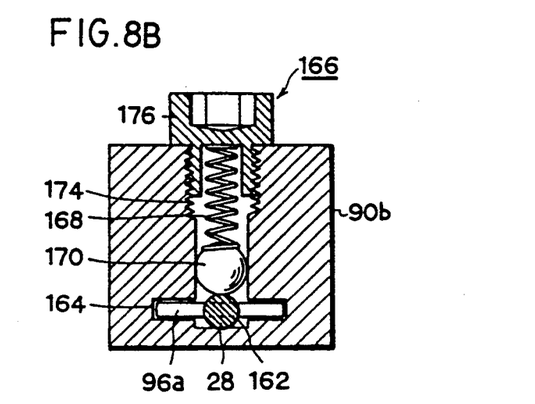
FIG. 8B is a detailed cross-sectional view taken along section line II—II of FIG. 6. showing a configuration in which a supporting member pushed by the plunger forces the blocking mechanism open and simultaneously slides through the supporting member passage shown in FIG. 6.

A passage 162 for the supporting member 28 and a passage 164 for the lower plunger 96a are formed in the slant chute 90b, as shown in FIG. 6 and FIGS. 8A and 8B. An opening and closing mechanism 166 of the passage 162 for the supporting member 28, which prevents the supporting member 28 from dropping out and extends the supporting member 28 in a stable way, are provided at a bottom end portion of the slant chute 90b.

The opening and closing mechanism 166 includes a steel ball 170 acted on by a compressed coil spring 168, and a threaded bolt 176 to be screwed into a nut portion 174 formed on an internal circumferential surface of an operating hole the slant chute 90b. The steel ball is inserted in this operating hole.

A nipple 178 is provided on the vertical chute 90a for admitting compressed air for correctly positioning the supporting member 28 dropping from the discharging drum 88 to the supporting member passage 162 of the slant chute 90b.

Figure 9:
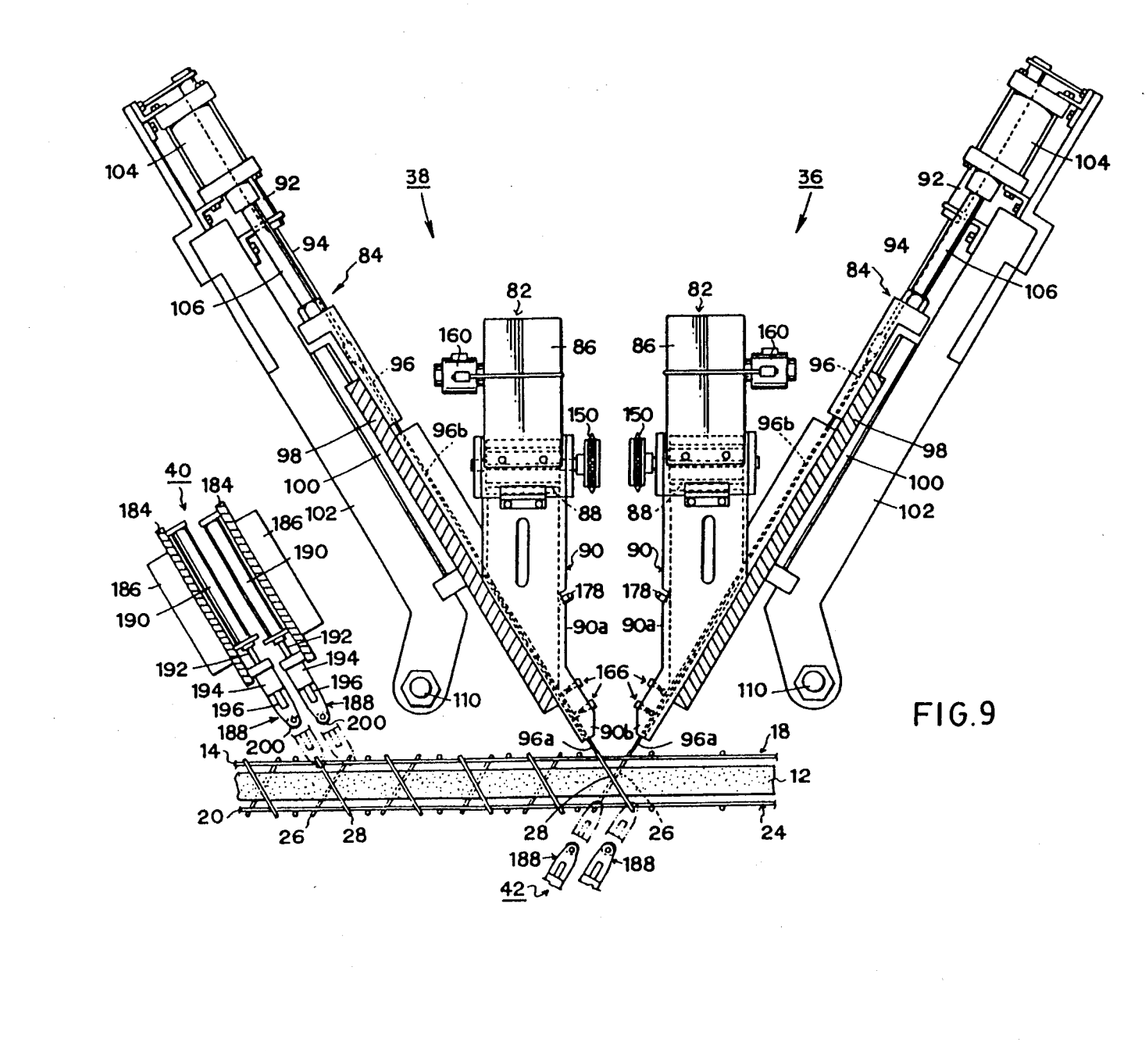
FIG. 9 is a partial side action view showing insertion of the supporting members by the feeding and inserting mechanisms shown in FIG. 2 into the upper wire mesh, the heat insulating core and the lower wire mesh, which are fixed with predetermined gaps between them by the clamping mechanism shown in FIGS. 4A, 4B, 4C and FIG. 3, and the contacting portions of the inserted supporting members with upper and lower wire meshes are being welded by the upper and lower welding mechanisms.
Figure 10:
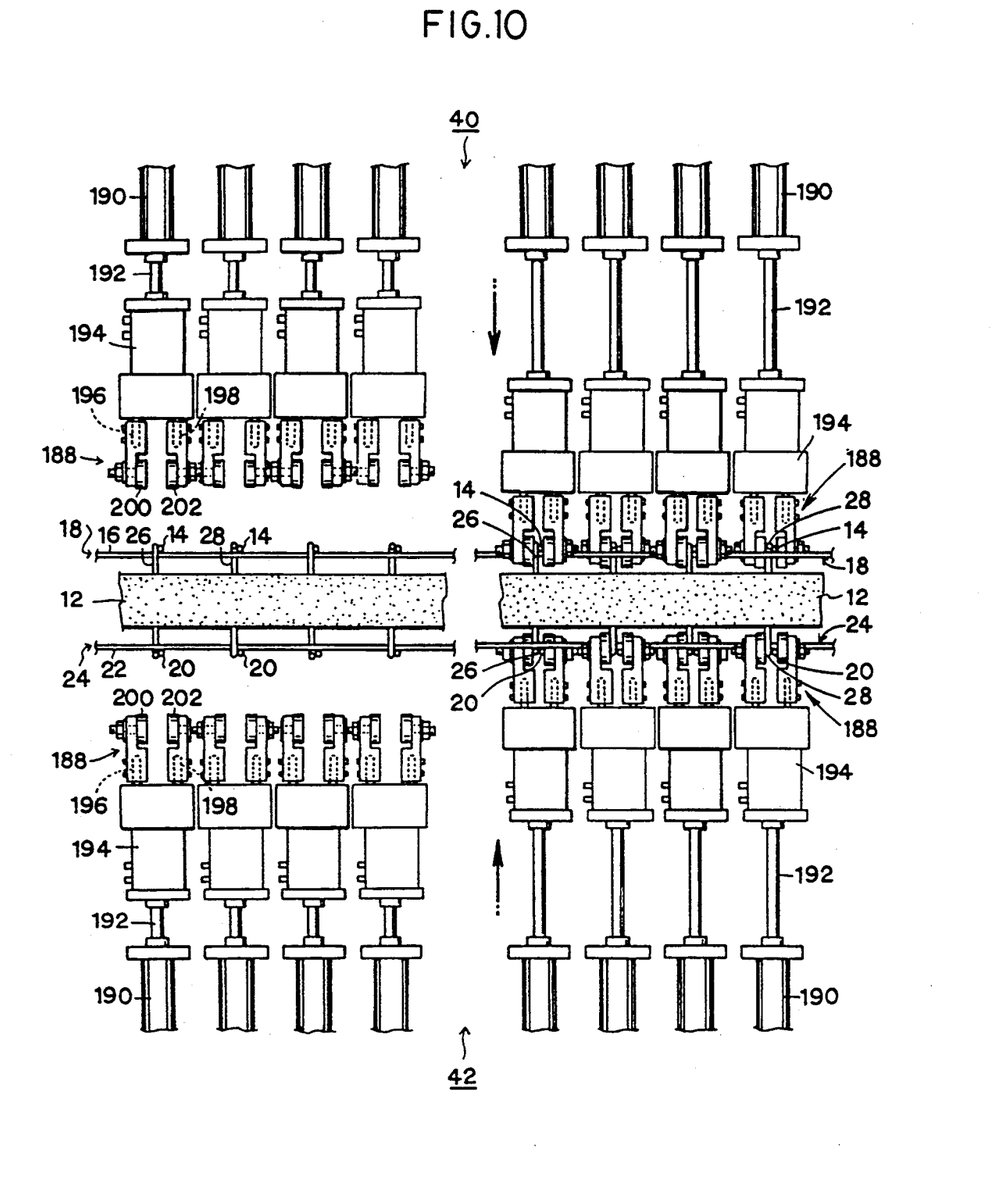
FIG. 10 shows two partial front action views showing operating states of the upper and lower welding mechanisms shown in FIG. 2 and FIG. 9.

FIG. 2, FIG. 9 and FIG. 10 show the structure and operating states of the upper electric welding mechanism 40 for spot welding the first and second supporting members 26,28 and the longitudinal wire 14 of the upper wire mesh 18, and the lower electric welding mechanism 42 for spot welding the longitudinal wire 20 of the lower wire mesh 24.

The upper and lower electric welding mechanisms 40, 42 are different only in location and orientation, but have the same structure. As shown in FIG. 2 and FIG. 9, they comprise respectively supporting plates 184 attached to upper and lower brackets 180,182 fixed to the inner side of the moving saddle 112, transformers 186 and electric spot welding units 188 provided on both sides of these supporting plates 184, and air cylinders 190 for moving these electric spot welding units up and down, respectively.

The electric spot welding unit 188 includes, as shown in FIG. 10, an air chuck 194 fixed at an end of a piston rod 192 of the air cylinder 190, and electrodes 200,202 fixed to movable jaws 196, 198 of this air chuck 194.

FIG. 2, 9 and 10 show an embodiment in which the electric spot welding units 188 of upper and lower electric welding mechanisms 40,42 are arranged in two rows. This is because of the spacing of the longitudinal wires 14,20 of upper and lower wire meshes 18,24 and the size of the electric spot welding unit 188. Otherwise the electric spot welding units 188 may be arranged in one single row or more than two rows in accordance with the situation.

FIGS. 2, 9 and 10 also show an air cylinder 190 for moving the air chuck 194 of the electric spot welding unit 188 up and down is provided for each air chuck 194. However it is also possible to arrange air chucks 194 on the supporting plate 184, to make this supporting plate 184 slidable on the upper and lower brackets 180,182, and to equip the mechanism so that the supporting plate 184 can be moved up and down by the air cylinder.

The operation of the preferred embodiment of the above-described manufacturing machine is as follows:

The lower wire mesh 24, a plate-shaped heat insulating core 12 and an upper wire mesh 18 are held steady. First and second supporting member feeding and inserting mechanisms 36,38 are moved above the subassembly including lower wire mesh 24, the plate-shaped heat insulating core 12 and the upper wire mesh 18. Then the first and second supporting members 26,28 are inserted through the lower wire mesh 24, the plate-shaped heat insulating core 12 and the upper wire mesh 18. After that, the longitudinal wires 14,20 of the upper and lower wire meshes 18,24 and the first an second supporting members 26,28 are spot welded by upper and lower electric welding mechanisms 40,42 which move together with the first and second supporting member feeding and inserting mechanisms 36,38 so as to manufacture a panel 10 as shown in FIG. 1.

The manufacturing machine of the present invention has a reciprocating carriage 44 provided with first and second supporting member feeding and inserting mechanisms 36,38 intermittently moved above the lower wire mesh 24, the plate-shaped heat insulating core 12 and the upper wire mesh 18 with predetermined gaps between them maintained by clamping mechanism 32. The clamping mechanisms 32 are provided on the front side frame 68 of the main frame 30. First and second supporting members 26,28, which are pre-cut to a predetermined length, are inserted through the subassembly including the insulating core and wire meshes. Contacting portions of the longitudinal wires 14,20 of the upper and lower wire meshes 18,24 and first and second supporting members 26,28 are welded to manufacture a panel 10. Because of the foregoing features of the manufacturing machine according to the invention, an entire length of the main frame 30 can be no more than about two times the panel length. Then the entire size and weight of the machine can be substantially reduced. Thus the machine is convenient to install and costs for making the manufacturing machine are reduced. Other advantages include a comparatively simple structure and a comparatively easy maintenance and repair.

It will be understood that each of the elements described above, or two or more together, may also find a useful application in other types of constructions differing from the types described above.

While the invention has been illustrated and described as embodied in a machine for manufacturing construction panels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. A machine for manufacturing a three-dimensional construction panel by a method comprising providing a subassembly consisting of a plate-shaped heat insulating core, (12) an upper wire mesh (18) held fixed and spaced from the heat insulating core (12) to form a predetermined gap between the heat insulating core (12) and the upper wire mesh (18) and a lower wire mesh (24) held fixed and spaced from the heat insulating core (12) to form a predetermined gap between the heat insulating core (12) and the lower wire mesh (24); inserting a plurality of first supporting members through said subassembly in an inclined direction through the upper and lower wire meshes and the heat insulating core; inserting a plurality of second supporting members through said subassembly in another inclined direction through the wire meshes and the heat insulating core, said other inclined direction being such that the second supporting members cross the first supporting members, said machine comprising:

a main frame (30);

a plurality of clamping means (32) for clamping end portions of the plate-shaped heat insulating core (12) and the upper and lower wire meshes (18,24) to provide the predetermined gaps between each of the wire meshes and the plate-shaped heat insulating core, each of said clamping means (32) being secured to the main frame (30), each of said wire meshes comprising a plurality of longitudinal wires (14,20);

a reciprocating carriage (44) mounted slidably in a longitudinal direction on the main frame (30);

carriage drive means (46) for moving the carriage (44) on the main frame (30) including a driving motor (140), an electromagnetic clutch (142) and a ball screw (144);

guide means (34) for maintaining the predetermined gaps between the heat insulating core (12) and the upper and lower wire meshes (18,24) clamped by the clamping means (32);

first and second supporting member feeding and inserting mechanisms (36,38), each of said feeding and inserting mechanisms including a plurality of feeding units (82) having hoppers (86) for discharging one-by-one a plurality of pre-cut first and second supporting members (26,28) and a plurality of inserting units (84), each of said inserting units including a pneumatic cylinder (92) having a piston rod (94) and a plunger (96) connected to the piston rod (94) of the pneumatic cylinder (92);

a plurality of upper electric welding mechanisms (4) for spot welding the longitudinal wires (14) of the upper wire meshes (18) with the first and second supporting members (26,28); and a plurality of lower electric welding mechanisms (42) for spot welding the longitudinal wires (20) of the lower wire meshes (24) with the first and second supporting members (26,28) to form a finished construction panel (10).

2. A machine as defined in claim 1, wherein each of the clamping means (32) includes an air chuck (48) and a plurality of movable jaws (50,52) attached to the air chuck (48), said movable jaws (50,52) including a lower attachment (54) having a protruberance (60) for contacting one side of an end portion of the plate-shaped heat insulating core (12), and a hook (62) for hooking the lower wire mesh (24) and for holding a bottom surface of the heat insulating core (12), and an upper attachment (56) having a protruberance (64) for contacting another side of the plate-shaped heat insulating core (12) and a hook (66) for hooking the upper wire mesh (18) and for pressing a top surface of the heat insulating core (12).

3. Machine as defined in claim 2, wherein said hooks (62,66) are each provided with a slit (74).

4. Machine as defined in claim 1, further comprising a fixed saddle (108) fixed on the reciprocating carriage (44), a moving saddle (112) movable to and from the fixed saddle (108) on the reciprocating carriage (44), and a manually operable moving mechanism (130) connected to said saddles(108,112) for adjustment of a spacing between said saddles.

5. Machine as defined in claim 1, wherein said plunger (96) of each of the inserting units (84) comprises a lower plunger (96a) thinner than the first and second supporting members (26,28) and an upper plunger (96b) connected to the piston rod (95) of the pneumatic cylinder (92) and to the lower plunger (96a).

6. Machine as defined in claim 5, wherein each of said feeding units (82) includes a slant chute (90b) provided with a passage (162) for the first and second supporting members (26,28) and a passage (164) for said lower plunger (96b).

7. Machine as defined in claim 6, further comprising means (166) for opening and closing each of said gassages (162) for the first and second supporting members (26,28), said means for opening and closing including a coil spring (168) and a steel ball (170) acted on by the coil spring (168).

8. Machine as defined in claim 6, further comprising an air jetting nipple (178) attached to a vertical chute (90a) of each of the feeding units (82) to receive compressed air for positioning the first and second supporting members (26,28) fed to the supporting member passage (162) of the slant chute (90b).

* * * * *